United States Patent
Wagoner et al.

(10) Patent No.: US 9,455,568 B2
(45) Date of Patent: Sep. 27, 2016

(54) ENERGY STORAGE SYSTEM FOR RENEWABLE ENERGY SOURCE

(71) Applicant: General Electric Company, Schenectady, NY (US)

(72) Inventors: Robert Gregory Wagoner, Roanoke, VA (US); Anthony Michael Klodowski, Hardy, VA (US); Steven Wade Sutherland, Roanoke, VA (US); Rafael Ignacio Bedia, Roanoke, VA (US); Benjamin Arthur Niemoeller, Cave Spring, VA (US)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 14/253,095

(22) Filed: Apr. 15, 2014

(65) Prior Publication Data

US 2015/0295398 A1    Oct. 15, 2015

(51) Int. Cl.

| | |
|---|---|
| *H02H 7/12* | (2006.01) |
| *H02J 7/00* | (2006.01) |
| *H02M 3/00* | (2006.01) |
| *H02J 3/32* | (2006.01) |
| *H02J 3/38* | (2006.01) |
| *H02H 7/18* | (2006.01) |

(52) U.S. Cl.
CPC .............. *H02H 7/1213* (2013.01); *H02J 3/32* (2013.01); *H02J 3/386* (2013.01); *H02H 7/18* (2013.01); *H02J 7/0031* (2013.01); *H02J 7/0052* (2013.01); *H02J 2007/0039* (2013.01); *H02J 2007/0059* (2013.01); *Y02E 10/766* (2013.01); *Y02E 70/30* (2013.01)

(58) Field of Classification Search
CPC ........ H02M 7/448; H02M 1/00; H02M 1/32; H02M 1/44; H02M 2001/0003; H02M 2001/0012; H02M 2001/007; H02M 2001/009; H02M 7/02; H02M 7/42; H02H 7/067; H02H 7/1213; H02H 7/18; Y02E 10/766; Y02E 70/30
USPC ...................... 363/132, 37, 47, 98; 361/104; 318/370–389
See application file for complete search history.

(56) References Cited

U.S. PATENT DOCUMENTS

| | | | | |
|---|---|---|---|---|
| 4,553,511 | A * | 11/1985 | Hayakawa | B60R 25/045 123/146.5 B |
| 5,469,350 | A * | 11/1995 | Nishio | H02M 5/4585 363/55 |
| 5,808,246 | A * | 9/1998 | Peruggi | B66B 13/143 187/316 |
| 6,472,945 | B1 * | 10/2002 | Gumm | H03B 5/24 331/138 |
| 7,170,761 | B2 * | 1/2007 | Yasumura | H02M 1/4241 363/17 |

(Continued)

*Primary Examiner* — Jessica Han
*Assistant Examiner* — Demetries A Gibson
(74) *Attorney, Agent, or Firm* — Dority & Manning, P.A.

(57) ABSTRACT

Renewable energy power systems, DC to DC converters, and methods for operating energy storage systems are provided. A system includes a power converter having a DC bus, and an energy storage system coupled to the DC bus of the power converter. The energy storage system includes an energy storage device and a switching power supply coupled between the energy storage device and the DC bus of the power converter. The switching power supply includes a plurality of switching elements, and an energy storage device protection circuit coupled between the plurality of switching elements and the energy storage device, the energy storage device protection circuit including a solid state switch. The switching power supply further includes a fuse coupled to the energy storage device protection circuit.

19 Claims, 4 Drawing Sheets

(56) References Cited

U.S. PATENT DOCUMENTS

| | | |
|---|---|---|
| 8,350,519 B2 | 1/2013 | Brantner et al. |
| 8,649,140 B2* | 2/2014 | Peterson .............. H02J 7/0031 361/78 |
| 9,160,191 B2* | 10/2015 | Kim ..................... H02J 7/0063 |
| 2010/0072950 A1* | 3/2010 | Tatebayashi .......... H02J 7/0031 320/134 |
| 2011/0031930 A1* | 2/2011 | Kajouke ........... H02M 3/33584 320/128 |
| 2013/0162206 A1* | 6/2013 | Takeuchi ............... H02J 7/025 320/108 |

* cited by examiner

ENERGY STORAGE SYSTEM FOR RENEWABLE ENERGY SOURCE

FIELD OF THE INVENTION

The present disclosure relates generally to renewable energy power systems, and more particular to an energy storage system for use in a renewable energy power system.

BACKGROUND OF THE INVENTION

Renewable energy power systems, such as wind energy power systems and solar energy power systems, often include a power converter with a regulated DC bus. For example, wind power systems, such as wind driven doubly-fed induction generator (DFIG) systems or full power conversion systems, can include a power converter with an AC-DC-AC topology. Solar power systems can include a power converter that has a DC-DC-AC topology or simply a DC-AC topology.

An energy storage system can be coupled to the DC bus of a power converter in a renewable energy power system. The energy storage system can be used, for instance, to apply power to the DC bus of the power converter during transient conditions. A switching power supply can be provided to transfer energy back and forth between the DC bus of the power converter and the energy storage device. For instance, the switching power supply can include a DC to DC converter configured to convert a first voltage on the DC bus to a second voltage at the energy storage device, and vice versa. It can be desirable for the switching power supply to be bi-directional to allow not only for power flow from the energy storage device to the DC bus during transient conditions but also to allow power flow from the DC bus to the energy storage device, for instance, to charge the energy storage device.

One issue that needs to be addressed with respect to the energy storage systems is the protection of the energy storage device from switching power supply faults. For example, if a component in the switching power supply such as a switching element fails, positive and/or negative voltage surges can be experienced in the switching power supply and transmitted to the energy storage device. Protection from such overvoltage and negative voltage events would be advantageous. Accordingly, improved energy storage systems and switching power supplies thereof, which provide improved fault protection, are desired in the art.

BRIEF DESCRIPTION OF THE INVENTION

Aspects and advantages of the invention will be set forth in part in the following description, or may be obvious from the description, or may be learned through practice of the invention.

In accordance with one embodiment, a renewable energy power system is provided. The system includes a power converter having a DC bus, and an energy storage system coupled to the DC bus of the power converter. The energy storage system includes an energy storage device and a switching power supply coupled between the energy storage device and the DC bus of the power converter. The switching power supply includes a plurality of switching elements, and an energy storage device protection circuit coupled between the plurality of switching elements and the energy storage device, the energy storage device protection circuit including a solid state switch. The switching power supply further includes a fuse coupled to the energy storage device protection circuit.

In accordance with another embodiment, a DC to DC power converter is provided. The DC to DC power converter includes a first transistor having a gate, a collector, and an emitter, and a second transistor having a gate, a collector, and an emitter, the collector of the second transistor being coupled to the emitter of the first transistor. The DC to DC power converter further includes an energy storage device protection circuit, the energy storage device protection circuit including a solid state switch and an antiparallel diode coupled in parallel with one another. The DC to DC power converter further includes a plurality of fuses coupled to the energy storage device protection circuit.

In accordance with another embodiment, a method of operating an energy storage system is provided. The method includes providing power between a DC bus and an energy storage device via a DC to DC converter coupled between the DC bus and the energy storage device. The method further includes firing a solid state switch of the DC to DC converter when an overvoltage event occurs, and providing a path for current flow through an antiparallel diode of the DC to DC converter when a negative voltage event occurs. The antiparallel diode is coupled in parallel with the solid state switch.

Variations and modifications can be made to these example embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
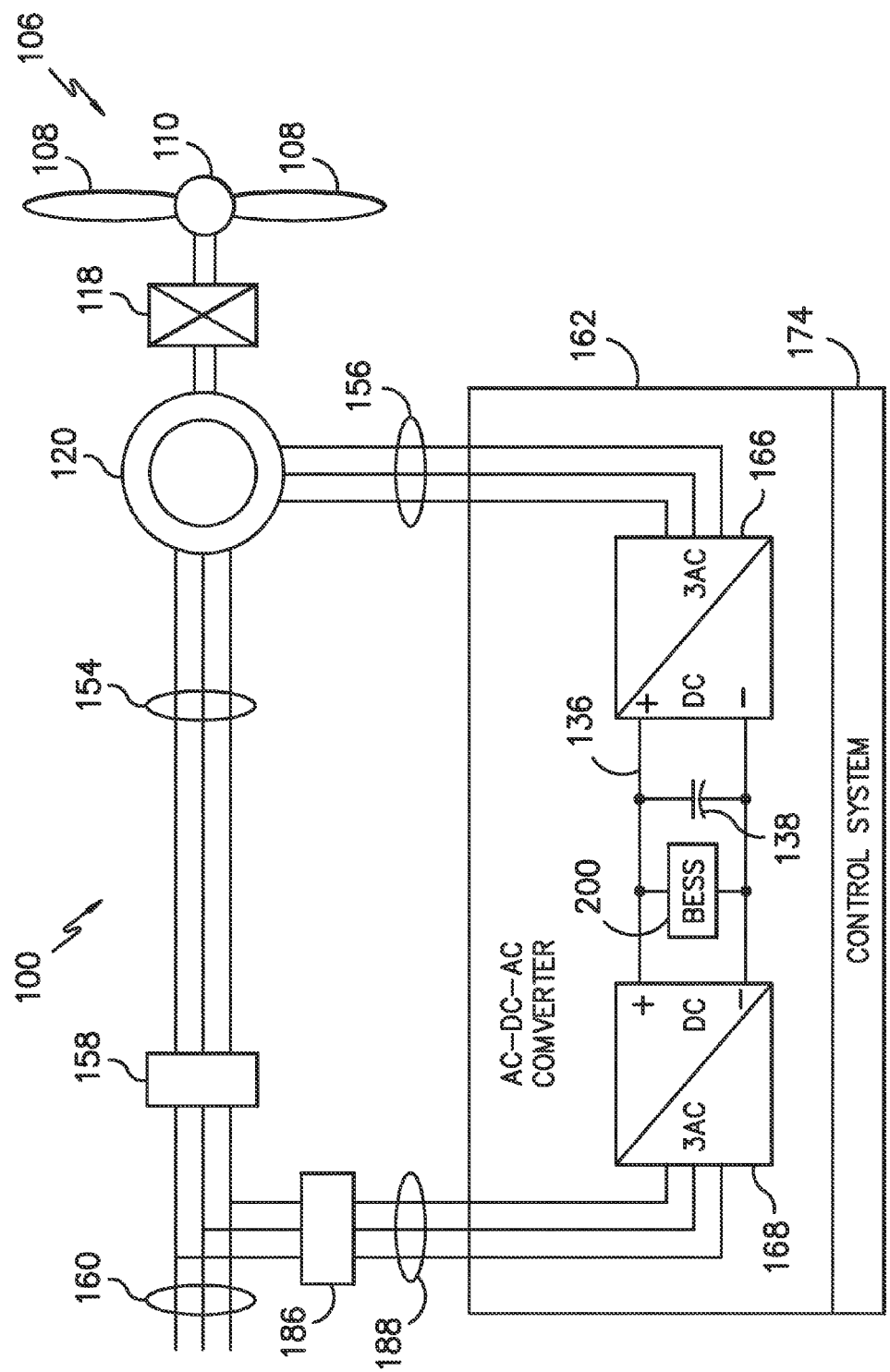
FIG. 1 depicts an example renewable energy power system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, example aspects of the present disclosure are directed to energy storage systems for use in renewable energy power systems. More particularly, an energy storage system can be coupled to the DC bus of a power converter used in a renewable energy power system. For example, the energy storage system can be coupled to the DC bus of an AC to DC to AC converter used in a wind energy power system. As another example, the renewable energy storage system can be coupled to the DC bus of a DC to DC to AC converter used in a solar energy system.

The energy storage system can include an energy storage device, such as a battery storage device, fuel cell, capacitor, or other suitable energy storage device. A switching power supply can be coupled between the energy storage device and the DC bus of the power converter. A control system can control the switching power supply to regulate power flow between the energy storage device and the DC bus. For instance, the switching power supply can be controlled to convert a first DC voltage at the DC bus to a second DC voltage at the battery energy storage device.

According to example aspects of the present disclosure, the switching power supply can include a DC to DC converter. In particular, bi-directional DC to DC converters may be utilized. In particular implementations, the DC to DC converter can include a topology that includes a first switching element and a second switching element coupled in series with one another. The first switching element can be a first insulated gate bipolar transistor (IGBT) having a gate, a collector, and an emitter. The second switching element can be a second insulated gate bipolar transistor (IGBT) having a gate, a collector, and an emitter. The collector of the first IGBT can be coupled to a positive terminal of the DC bus. The emitter of the first IGBT can be coupled to the collector of the second IGBT. The emitter of the second IGBT can be coupled to a negative terminal of the DC bus. A first diode can be coupled in parallel with the first IGBT. A second diode can be coupled in parallel with the second IGBT.

According to particular aspects of the present disclosure, a bi-directional converter can be configured to accommodate power flow in two directions. For instance, a control system can operate the energy storage system in a first mode such that power flows in a first direction from the DC bus to the energy storage device, for instance, to charge the energy storage device. The control system can also be configured to operate the energy storage system in a second mode such that power flows in a second direction from the energy storage device to the DC bus, for instance, to provide supplemental power to the DC bus during transient conditions (e.g. a reduction in wind in a wind energy system or a reduction in sunlight in a solar energy system).

The switching power supply, such as the DC to DC converter, can also advantageously include various components which may operate to protect the energy storage device in the event of switching power supply faults, which may result in overvoltage events and/or negative voltage events. An overvoltage event is generally any period during which voltages flowing through the switching power supply exceed a predetermined limit for the energy storage device. A negative voltage event is generally any period during which voltages flowing through the switching power supply are negative.

For example, the switching power supply may include an energy storage device protection circuit. The energy storage device protection circuit may include, for example, a solid state switch, such as in exemplary embodiments a silicon-controlled rectifier ("SCR"). Additionally, an anti-parallel diode may be coupled in parallel to the solid state switch, and a resistor may be coupled in series with the solid state switch and anti-parallel diode.

Additionally, the switching power supply may include various fuses which are sized to protect other components of the switching power supply, such as the energy storage protection circuit. For example, fuses may be coupled between the switching power supply and the switching elements. These fuses may be sized to clear at voltage levels which are below, for example, the rated maximum voltage of the solid state switch. Additionally, a fuse may be coupled in the energy storage device.

With reference now to the FIGS., example embodiments of the present disclosure will now be discussed in detail. FIG. 1 depicts an example wind driven doubly-fed induction generator (DFIG) system 100. Example aspects of the present disclosure are discussed with reference to the DFIG wind turbine system 100 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the example system 100, a rotor 106 includes a plurality of rotor blades 108 coupled to a rotating hub 110, and together define a propeller, such as of a wind turbine. The propeller is coupled to an optional gear box 118, which is, in turn, coupled to a generator 120. In accordance with aspects of the present disclosure, the generator 120 is a doubly fed induction generator (DFIG) 120.

DFIG 120 is typically coupled to a stator bus 154 and a power converter 162 via a rotor bus 156. The stator bus 154 provides an output multiphase power (e.g. three-phase power) from a stator of DFIG 120 and the rotor bus 156 provides an output multiphase power (e.g. three-phase power) of a rotor of the DFIG 120. Referring to the power converter 162, DFIG 120 is coupled via the rotor bus 156 to a rotor side converter 166. The rotor side converter 166 is coupled to a line side converter 168 which in turn is coupled to a line side bus 188.

In example configurations, the rotor side converter 166 and the line side converter 168 are configured for normal operating mode in a three-phase, pulse width modulation (PWM) arrangement using insulated gate bipolar transistor (IGBT) switching elements. The rotor side converter 166 and the line side converter 168 can be coupled via a DC bus 136 across which is the DC bus capacitor 138.

The power converter 162 can be coupled to a control system 174 to control the operation of the rotor side converter 166 and the line side converter 168 and other aspects of the power system 100. The control system 174 can include any number of control devices. In one implementation, the control system 174 can include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 162 and in other aspects of the power system 100, such as a power switching supply used in an energy storage system 200.

In operation, alternating current power generated at DFIG 120 by rotation of the rotor 106 is provided via a dual path to electrical grid 160. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC bus 136. Switching elements (e.g. IGBTs) used in bridge circuits of the rotor side power converter 166 can be modulated to convert the AC power provided from the rotor bus 156 into DC power suitable for the DC bus 136.

The line side converter 168 converts the DC power on the DC bus 136 into AC output power suitable for the electrical grid 160. In particular, switching elements (e.g. IGBTs) used in bridge circuits of the line side power converter 168 can be modulated to convert the DC power on the DC bus 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 160 (e.g. 50 Hz/60 Hz).

Various circuit breakers and switches, such as a converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

According to example aspects of the present disclosure, a battery energy storage system 200 can be coupled to the power converter 162 of the power system 100. The present disclosure is discussed with reference to a battery energy storage system for purposes of illustration and discussion. Those of ordinary skill in the art, using the disclosures provided herein, should understand that aspects of the present disclosure are also applicable in other energy storage systems.

The battery energy storage system 200 can be coupled to the DC bus 136 of the power converter 162. The energy storage system 200 can be used to provide power to the DC bus 136 under certain conditions. For instance, the energy storage system 200 can be used to provide power to the DC bus 136 to increase output of the power system 100 when wind speed drops. Power can also be supplied and stored in the energy storage system 200 during operation of the DFIG system 100.

Figure 2:
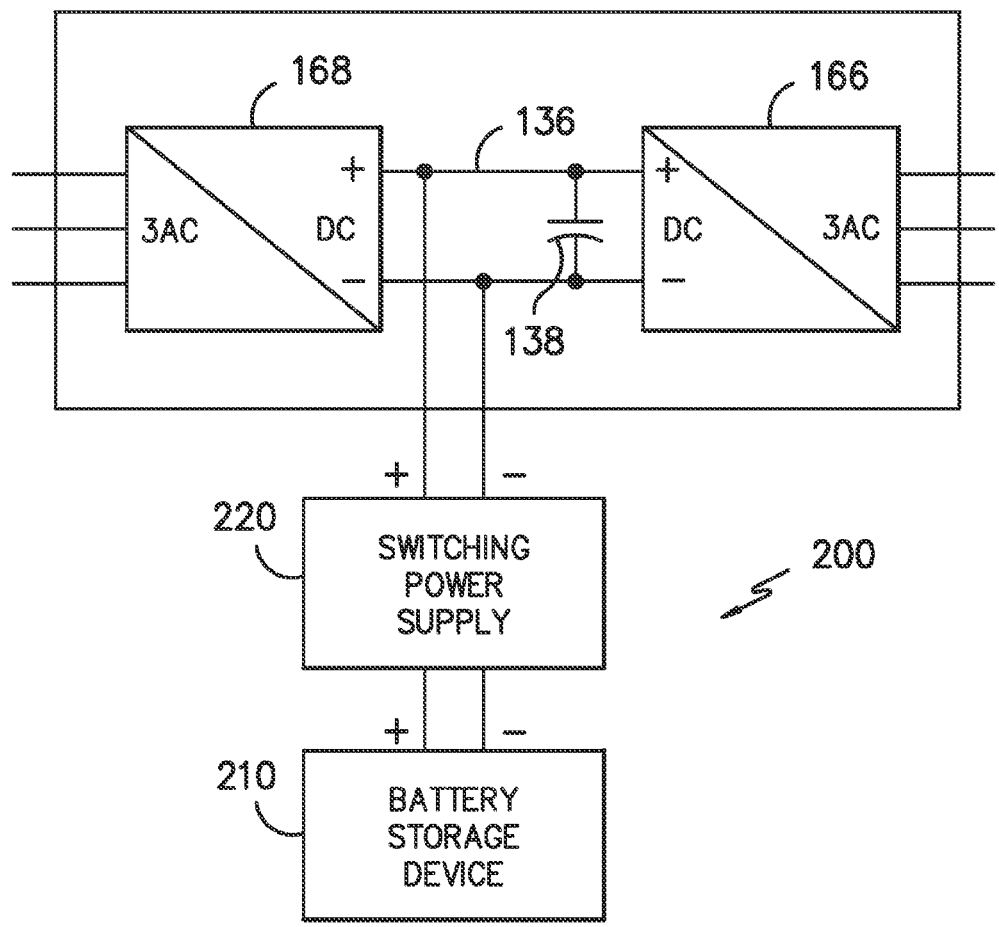
FIG. 2 depicts an example energy storage system coupled to the DC bus of a power converter according to example embodiments of the present disclosure.

FIG. 2 depicts an example battery energy storage system 200 coupled to the DC bus 136 of a power converter 162. The battery energy storage system 200 can include a battery energy storage device 210. The battery energy storage device 210 can be coupled to the DC bus 136 via a switching power supply 220, such as a DC to DC converter. The switching power supply 220 can convert the DC power on the DC bus to a DC voltage that is suitable for application to the battery energy storage device 210.

The switching power supply 220 can include a plurality of switching elements (e.g. IGBTs or other switching elements). The switching elements can be controlled, for instance, by control system 174 (FIG. 1) to regulate power flow in the energy storage system 200. For example, during times of high power output, a first switching element can be controlled such that power flows in a first direction from the DC bus 136 to the energy storage device 210 to charge the energy storage device 210. During times of low power output, a second switching element can be controlled such that power flows in a second direction from the energy storage device 210 to the DC bus 136 for use in boosting output of the power system.

According to particular aspects of the present disclosure, the switching power supply 220 can be a DC to DC converter, such as a bi-directional DC to DC converter. The DC to DC converter can be configured to convert a first DC voltage at the DC bus 136 to a second DC voltage at the energy storage device 210. In particular embodiments, the bi-directional DC to DC converter can be any converter capable of accommodating power flow in two directions.

Figure 3:
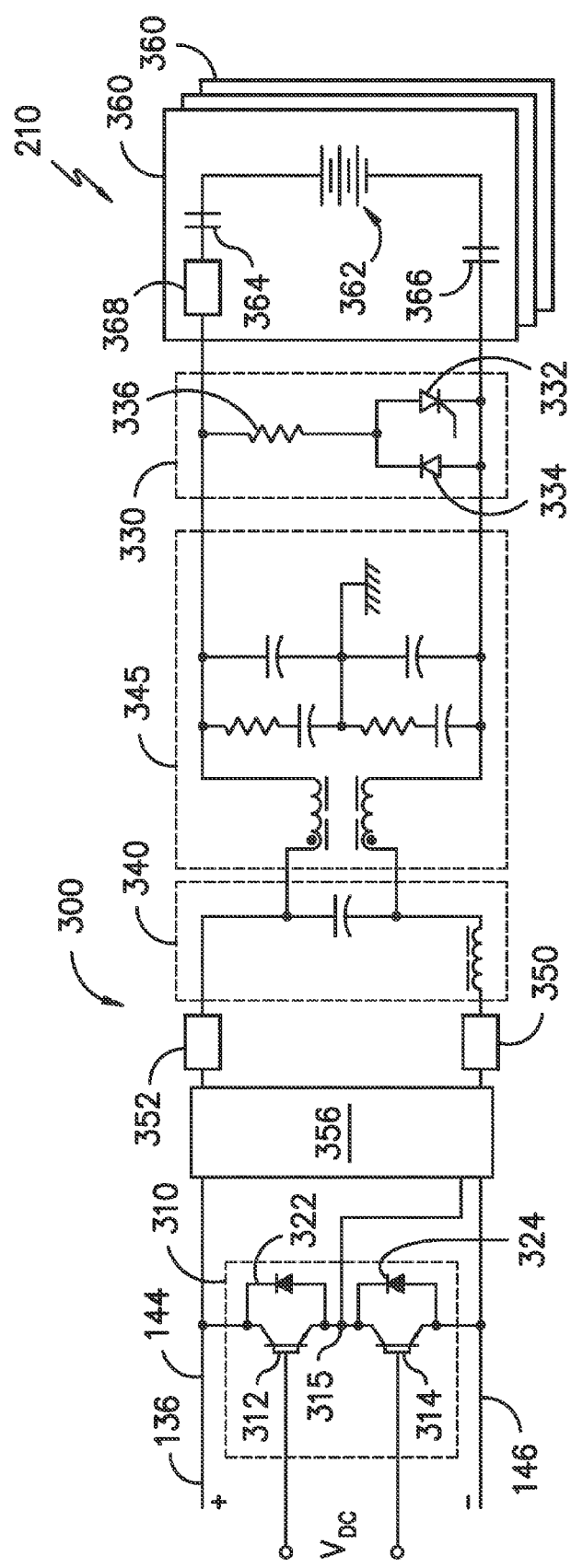
FIG. 3 depicts example topology for an example switching power supply for an energy storage system according to example embodiments of the present disclosure.

FIG. 3 depicts example topology for a DC to DC converter 300 that can be used as a switching power supply according to example aspects of the present disclosure. The DC to DC converter 300 can include a bridge circuit 310 coupled to a DC bus 136. The DC bus 136 can have a positive terminal 144 and a negative terminal 146 The bridge circuit 310 can include a first switching element 312 and a second switching element 314 coupled in series with one another. The first switching element 312 and the second switching element 314 can be any suitable switching device, such as an IGBT, power MOSFET, or other suitable switching device.

For instance, the first switching element 312 can be a first IGBT having a gate, a collector, and an emitter. The second switching element 314 can be a second IGBT having a gate, a collector, and an emitter. The collector of the first IGBT 312 can be coupled to the positive terminal 144 of the DC bus 136. The emitter of the first IGBT 312 can be coupled to the collector of the second IGBT 314. The emitter of the second IGBT can be coupled to the negative terminal 146 of the DC bus 136.

The first switching element 312 can be coupled to a first antiparallel diode 322. The second switching element 314 can be coupled to a second antiparallel diode. One or more of the first switching element 312 and the second switching element 314 can be controlled to convert a first DC voltage $V_{DC}$ on the DC bus 136 to a second DC voltage $V_{OUT}$ at the energy storage device. More particularly, pulse width modulation commands (e.g. gate drive commands) can be provided to the first switching element 312 or the second switching element 314 to adjust the pulse width of the DC to DC converter to regulate power flow between the DC bus 136 and an energy storage device.

The DC to DC converter 300 may further include an energy storage device protection circuit 330. Circuit 330 protects the energy storage device 210 and system 200 in the event of switching power supply faults and resulting overvoltage events and/or negative voltage events. As illustrated, circuit 330 includes solid state switch 332. In the embodiment illustrated, solid state switch 332 is an SCR, although in alternative embodiments any suitable solid state switch may be utilized. The switch 332 may be fired when an overvoltage event occurs. Accordingly if the voltage in converter 300 increases above a predetermined threshold for the switch, the switch may fire. This protects the device 210 in overvoltage events.

An anti-parallel diode 334 may additionally be included in the circuit 330, and may be coupled in parallel with the solid state switch 332. Anti-parallel diode 334 may protect the device 210 during negative voltage events, by providing a path for current flow through the circuit 330 and system generally.

Further, as illustrated, a resistor 336 may be included in the circuit 330. Resistor 336 may be coupled in series with the switch 332 and the diode 334.

Various filters may be included in the converter 300. The filters may generally filter the output of the plurality of switching elements to provide an output DC current and output DC voltage at the energy storage device 210. For example, a normal mode filter 340 can be coupled between the plurality of switching elements and the circuit 330. Additionally or alternatively, a common mode filter 345 may be coupled between the plurality of switching elements and the circuit 330, such as between the normal mode filter 340 and the circuit 330. It should be understood that the normal mode filter 340 and common mode filter 345 are not limited to the components and arrangements thereof as illustrated in FIG. 3, and rather that any suitable normal mode filter 340 and/or common mode filter 345 having more or less components in any suitable arrangement are within the scope and spirit of the present disclosure.

Various fuses may additionally be provided in the DC to DC power converter 300, to protect the device 210 and the various other components of the converter 300. In particular, fuses may be coupled between the plurality of switching elements and the solid state switch 332. For example, a fuse 350 may be coupled to node 315 between the first and second switching elements. Additionally or alternatively, a fuse 352 may be coupled to the positive terminal 144 of the DC bus 136, such as to the collector of the first switching element in embodiments wherein the switching element is a transistor. Notably, in some embodiments, a breaker 356 may be coupled between one or more of the switching elements and the fuse(s) 350, 352. Breaker 356 may for example, be coupled between the first switching element 312 and one or both fuses 350, 352. Both fuses may be operable to clear at predetermined thresholds. In exemplary embodiments, one or both fuses 350, 352 may be operable to clear at predetermined thresholds which are below a voltage rating for the solid state switch 332. The voltage rating is a maximum voltage that the switch 332 can handle before damage is likely to occur. Accordingly, a lower predetermined fuse threshold may protect the solid state switch 332, as well as other various components of the DC to DC power converter 300.

Additionally or alternatively, a fuse may be coupled in the energy storage device 210. For example, as discussed, in some embodiments the energy storage device 210 is a battery energy storage device 210. The device 210 may include one or more battery modules 360, which may in the case of two or more be coupled in parallel to each other. A battery module 360 may include a battery 362, a first switch 364 and a second switch 366, as illustrated. Further, battery module 360 may include a fuse 368. The fuse 368 may be coupled in series to the first switch 364. Fuse 368 may be operable to clear at a predetermined threshold. In exemplary embodiments, fuse 368 may be operable to clear at a predetermined threshold which is below a voltage rating for another component of the battery module 360, such as the first switch 364. Accordingly, a lower predetermined fuse threshold may protect the first switch 364, as well as other various components of the battery module 360.

Figure 4:
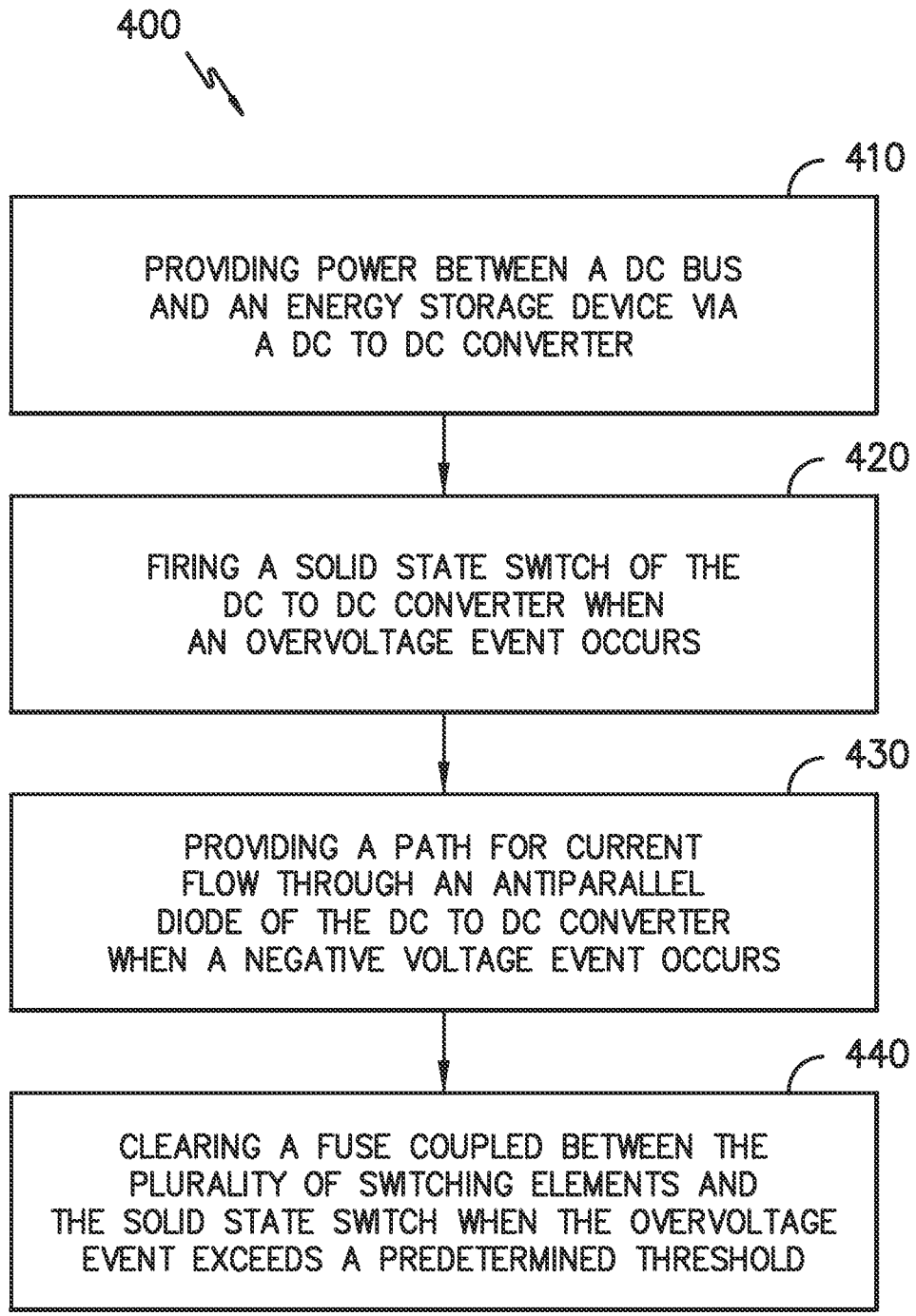
FIG. 4 depicts a flow diagram of an example method of operating an energy storage system according to example embodiments of the present disclosure.

FIG. 4 depicts a flow diagram of an example method 400 for operating an energy storage system according to an example embodiment of the present disclosure. The method 400 can be implemented using any suitable energy storage system, such as the energy storage system 200 depicted in FIG. 2. In addition, FIG. 4 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

At step 410, a method as illustrated may include providing power between a DC bus 136 and an energy storage device 210 via a DC to DC converter 300 coupled between the DC bus 136 and the energy storage device 210. Power may be provided to the energy storage device 210 in some embodiments, or alternatively may be provided to the DC bus 136, as discussed herein. In exemplary embodiments, the power is provided through a plurality of switching elements, such as elements 312, 314, of the DC to DC converter 300.

At step 420, a method as illustrated may include firing a solid state switch 332 of the DC to DC converter 300 when an overvoltage event occurs, as discussed herein. At step 430, a method as illustrated may include providing a path for current flow through an antiparallel diode 334 of the DC to DC converter 300 when a negative voltage event occurs, as discussed herein.

In some exemplary embodiments, such as at step 440 as illustrated, a method may further include clearing one or more fuses, such as fuses 350, 352, coupled between the plurality of switching elements and the solid state switch 332 when the overvoltage event exceeds a predetermined threshold. The predetermined threshold may for example be below a voltage rating for the solid state switch 332. Additionally or alternatively, a method may further include clearing one or more fuses, such as fuse 368, coupled in a battery module 360 when the overvoltage event exceeds a predetermined threshold. The predetermined threshold may for example be below a voltage rating for another component of the battery module 360, such as a switch 364.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A renewable energy power system, comprising:
A DC to DC power converter having a DC bus;
a battery energy storage system coupled to the DC bus of the power converter, the battery energy storage system comprising an energy storage device and a switching power supply coupled between the energy storage device and the DC bus of the power converter, the switching power supply comprising:
a plurality of switching elements;
an energy storage device protection circuit coupled between the plurality of switching elements and the energy storage device, the energy storage device protection circuit comprising a solid state switch and a antiparallel diode coupled in parallel with the solid state switch, the solid state switch comprising an anode, a cathode, and a gate; and
a fuse coupled to the energy storage device protection circuit.

2. The renewable energy power system of claim 1, wherein the energy storage device protection circuit further comprises a resistor coupled in series with the solid state switch.

3. The renewable energy power system of claim 1, wherein the solid state switch is a silicon-controlled rectifier.

4. The renewable energy power system of claim 1, wherein the plurality of switching elements comprise a first switching element and a second switching element coupled in series with one another.

5. The renewable energy power system of claim 4, wherein the fuse is coupled to a node between the first switching element and the second switching element.

6. The renewable energy power system of claim 4, wherein the fuse is coupled to a positive terminal of the DC bus.

7. The renewable energy power system of claim 1, wherein the energy storage device comprises a battery module, the battery module comprising a first switch, a battery, a second switch, and a fuse coupled in series to the first switch.

8. The renewable energy power system of claim 1, wherein the switching power supply further comprises a normal mode filter coupled between the plurality of switching elements and the energy storage device protection circuit, and a common mode filter coupled between the normal mode filter and the energy storage device protection circuit.

9. A DC to DC power converter comprising:
a first transistor having a gate, a collector, and an emitter;
a second transistor having a gate, a collector, and an emitter, the collector of the second transistor being coupled to the emitter of the first transistor;
an energy storage device protection circuit, the energy storage device protection circuit comprising a solid state switch and an antiparallel diode coupled in parallel with one another, the solid state switch comprising an anode, a cathode, and a gate; and
a plurality of fuses coupled to the energy storage device protection circuit.

10. The DC to DC power converter of claim 9, wherein the plurality of fuses comprises a fuse coupled to a node between the first transistor and the second transistor.

11. The DC to DC power converter of claim 9, wherein the plurality of fuses comprises a fuse coupled to the collector of the first transistor.

12. The DC to DC power converter of claim 11, further comprising a breaker coupled between the first transistor and the fuse.

13. The DC to DC power converter of claim 9, wherein the solid state switch is a silicon-controlled rectifier.

14. The DC to DC power converter of claim 9, wherein the energy storage device protection circuit further comprises a resistor coupled in series with the solid state switch and the antiparallel diode.

15. The DC to DC power converter of claim 9, further comprising a normal mode filter coupled between the first and second transistors and the energy storage device protection circuit, and a common mode filter coupled between the normal mode filter and the energy storage device protection circuit.

16. A method of operating an energy storage system, the method comprising:
providing power between a DC bus and an energy storage device via a DC to DC power converter coupled between the DC bus and the energy storage device;
while providing power, firing a solid state switch of the DC to DC power converter when an overvoltage event occurs, the solid state switch comprising an anode, a cathode, and a gate; and
providing a path for current flow through an antiparallel diode of the DC to DC converter when the overvoltage event is negative, the antiparallel diode coupled in parallel with the solid state switch.

17. The method of claim 16, wherein the power is provided through a plurality of switching elements of the DC to DC converter.

18. The method of claim 17, further comprising clearing a fuse coupled between the plurality of switching elements and the solid state switch when the overvoltage event exceeds a predetermined threshold.

19. The method of claim 18, wherein the predetermined threshold is below a voltage rating for the solid state switch.

* * * * *